(12) United States Patent
Baydo et al.

(10) Patent No.: US 7,431,957 B2
(45) Date of Patent: *Oct. 7, 2008

(54) FOOD GRADE INK JET INKS FOR PRINTING ON EDIBLE SUBSTRATES

(75) Inventors: Robert A. Baydo, San Marcos, CA (US); Benedict D. Fabian, San Diego, CA (US); Zahra S. Fathollahi, San Diego, CA (US); Diane V. Graff, Escondido, CA (US); Constance L. Lee, Pauma Valley, CA (US); Penny F. Martin, St. Louis, MO (US)

(73) Assignee: Sensient Imaging Technologies, Inc., Escondido, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/149,660

(22) Filed: Jun. 10, 2005

(65) Prior Publication Data

US 2006/0034984 A1 Feb. 16, 2006

Related U.S. Application Data

(60) Provisional application No. 60/578,774, filed on Jun. 10, 2004.

(51) Int. Cl.
*A23L 1/27* (2006.01)
(52) U.S. Cl. .................................... 426/250
(58) Field of Classification Search .................. 426/250
See application file for complete search history.

(56) References Cited

U.S. PATENT DOCUMENTS

| | | | |
|---|---|---|---|
| 2,258,347 A | 10/1941 | Biggert, Jr. | |
| 2,385,613 A | 9/1945 | Davis | |
| 2,948,626 A | 8/1960 | Sanders, Jr. | |
| 2,982,234 A | 5/1961 | Ackley et al. | |
| 3,015,610 A | 1/1962 | Sanders, Jr. | |
| 3,258,347 A | 6/1966 | Brown | |
| 3,677,691 A * | 7/1972 | Koch .............................. | 8/529 |
| 3,694,237 A | 9/1972 | Piotrowski | |
| 3,806,607 A | 4/1974 | Whelan | |
| 4,021,252 A | 5/1977 | Banczak et al. | |
| 4,168,662 A | 9/1979 | Fell | |
| 4,177,075 A | 12/1979 | Mansukhani | |
| 4,239,543 A | 12/1980 | Beasley | |
| 4,307,117 A | 12/1981 | Leshik | |
| 4,327,077 A * | 4/1982 | Puglia et al. ................. | 424/441 |
| 4,421,559 A | 12/1983 | Owatari | |
| 4,512,807 A | 4/1985 | Ogawa et al. | |
| 4,548,825 A | 10/1985 | Voss et al. | |
| 4,578,273 A | 3/1986 | Krubert | |
| 4,601,756 A | 7/1986 | Chiba et al. | |
| 4,620,876 A | 11/1986 | Fujii et al. | |
| 4,670,271 A | 6/1987 | Pasternak | |
| 4,694,302 A | 9/1987 | Hackleman et al. | |
| 4,761,180 A | 8/1988 | Askeland et al. | |
| 4,781,758 A | 11/1988 | Gendler et al. | |
| 4,791,165 A | 12/1988 | Bearss et al. | |
| 4,810,292 A | 3/1989 | Palmer et al. | |
| 4,825,227 A | 4/1989 | Fischbeck et al. | |
| 4,853,037 A | 8/1989 | Johnson et al. | |
| 4,937,598 A | 6/1990 | Hine et al. | |
| 5,006,362 A | 4/1991 | Hilborn | |
| 5,073,399 A | 12/1991 | Vassiliou | |
| 5,091,004 A | 2/1992 | Tabayashi et al. | |
| 5,112,399 A | 5/1992 | Slevin et al. | |
| 5,152,969 A | 10/1992 | Kleid et al. | |
| 5,156,675 A | 10/1992 | Breton et al. | |
| 5,221,332 A | 6/1993 | Kohlmeier | |
| 5,265,315 A | 11/1993 | Hoisington et al. | |
| 5,281,261 A | 1/1994 | Lin | |
| 5,316,575 A | 5/1994 | Lent et al. | |
| 5,397,387 A | 3/1995 | Deng et al. | |
| 5,409,715 A | 4/1995 | Meyers | |

(Continued)

FOREIGN PATENT DOCUMENTS

CH 662 358 12/1978

(Continued)

OTHER PUBLICATIONS

Van Nieuwenhuyzen, "Lecithin Production and Properties", J. Am. Oil Chem. Soc, vol. 53, pp. 425-427, 1976.*

(Continued)

*Primary Examiner*—C. Sayala
(74) *Attorney, Agent, or Firm*—Michael Best & Friedrich LLP

(57) ABSTRACT

Food grade colored fluids which include food grade dyes and food grade glycols are provided. Also provided are methods for applying the food grade colored fluids directed to the surface of an edible substrate, and edible substrates having the food grade colored fluids applied to a surface thereof. In some embodiments the food grade colored fluids include a surface tension modifier to reduce their surface tensions. The food grade colored fluids may optionally include glycerine and water. In one embodiment, the food grade glycol makes up at least about 25 wt. % of the colored fluid and water makes up no more than about 35 wt. % of the colored fluid.

50 Claims, No Drawings

U.S. PATENT DOCUMENTS

| | | | |
|---|---|---|---|
| 5,423,252 A | 6/1995 | Yamamoto et al. |
| 5,431,720 A | 7/1995 | Nagai et al. |
| 5,431,722 A | 7/1995 | Yamashita et al. |
| 5,435,840 A | 7/1995 | Hilborn |
| 5,439,514 A | 8/1995 | Kashiwazaki et al. |
| 5,443,628 A | 8/1995 | Loria et al. |
| 5,453,122 A | 9/1995 | Lyon |
| 5,462,590 A | 10/1995 | Yui et al. |
| 5,466,287 A | 11/1995 | Lyon |
| 5,505,755 A | 4/1996 | Ernst |
| 5,522,922 A | 6/1996 | Furusawa et al. |
| 5,531,818 A | 7/1996 | Lin et al. |
| 5,534,281 A | 7/1996 | Pappas et al. |
| 5,580,372 A | 12/1996 | Gino et al. |
| 5,601,639 A | 2/1997 | Myers et al. |
| 5,611,851 A | 3/1997 | DeLuca et al. |
| 5,624,485 A | 4/1997 | Calhoun |
| 5,637,139 A | 6/1997 | Morelos et al. |
| 5,659,346 A | 8/1997 | Moynihan et al. |
| 5,667,569 A | 9/1997 | Fujioka |
| 5,681,380 A | 10/1997 | Nohr et al. |
| 5,705,247 A | 1/1998 | Arai et al. |
| 5,757,391 A | 5/1998 | Hoisington |
| 5,800,601 A | 9/1998 | Zou et al. |
| 5,935,310 A | 8/1999 | Engel et al. |
| 5,961,703 A | 10/1999 | Fraas |
| 5,972,085 A | 10/1999 | Simpson |
| 6,020,397 A | 2/2000 | Matzinger |
| 6,058,843 A | 5/2000 | Young |
| 6,067,996 A | 5/2000 | Weber et al. |
| 6,123,848 A | 9/2000 | Quepons Dominguez et al. |
| 6,231,654 B1 | 5/2001 | Elwakil |
| 6,231,896 B1 * | 5/2001 | Ford et al. .................. 426/3 |
| 6,267,997 B1 | 7/2001 | Ream et al. |
| 6,277,498 B1 | 8/2001 | Endo et al. |
| 6,299,374 B1 | 10/2001 | Naor et al. |
| 6,495,179 B1 | 12/2002 | Zietlow et al. |
| 6,576,347 B1 | 6/2003 | Gomez Portela |
| 6,607,744 B1 | 8/2003 | Ribi |
| 6,616,958 B1 | 9/2003 | Stewart |
| 6,623,553 B2 | 9/2003 | Russell et al. |
| 6,627,212 B2 | 9/2003 | Uzunian et al. |
| 6,648,951 B2 | 11/2003 | Chen et al. |
| 6,652,897 B1 | 11/2003 | Stewart |
| 6,660,318 B2 | 12/2003 | Yoon et al. |
| 6,706,098 B2 | 3/2004 | Leu et al. |
| 6,747,072 B1 | 6/2004 | Siddiqui |
| 6,866,863 B2 | 3/2005 | Ribi |
| 6,887,504 B2 | 5/2005 | Palmer et al. |
| 6,893,671 B2 | 5/2005 | Ben-Yoseph et al. |
| 6,902,609 B2 | 6/2005 | Steffenino et al. |
| 7,083,805 B2 | 8/2006 | Begleiter |
| 7,166,153 B2 | 1/2007 | Russell et al. |
| 2001/0038871 A1 | 11/2001 | Nardi |
| 2001/0046535 A1 | 11/2001 | Bowling |
| 2002/0008751 A1 | 1/2002 | Spurgeon et al. |
| 2002/0034475 A1 | 3/2002 | Ribi |
| 2002/0078858 A1 | 6/2002 | Chen et al. |
| 2002/0114863 A1 | 8/2002 | Ream et al. |
| 2002/0114878 A1 | 8/2002 | Ben-Yoseph et al. |
| 2002/0135651 A1 | 9/2002 | Spurgeon et al. |
| 2003/0037700 A1 | 2/2003 | Leu et al. |
| 2003/0097949 A1 | 5/2003 | Candler et al. |
| 2003/0103905 A1 | 6/2003 | Ribi |
| 2003/0161913 A1 | 8/2003 | Stewart |
| 2003/0198720 A1 | 10/2003 | Stewart |
| 2004/0004649 A1 | 1/2004 | Bibl et al. |
| 2004/0013778 A1 | 1/2004 | Ackley, Jr. et al. |
| 2004/0021757 A1 | 2/2004 | Shastry et al. |
| 2004/0050289 A1 | 3/2004 | Russell et al. |
| 2004/0086603 A1 | 5/2004 | Shastry et al. |
| 2004/0086605 A1 | 5/2004 | Sox |
| 2004/0101615 A1 | 5/2004 | Barker et al. |
| 2004/0120991 A1 | 6/2004 | Gardner et al. |
| 2004/0170725 A1 | 9/2004 | Begleiter |
| 2004/0175463 A1 | 9/2004 | Shastry et al. |
| 2004/0213875 A1 | 10/2004 | Stewart |
| 2005/0003055 A1 | 1/2005 | Baydo et al. |
| 2005/0003056 A1 | 1/2005 | Romanach et al. |
| 2005/0008735 A1 | 1/2005 | Pearce |
| 2005/0058749 A1 | 3/2005 | Romanach et al. |
| 2005/0058753 A1 | 3/2005 | Romanach et al. |
| 2005/0061184 A1 | 3/2005 | Russell et al. |
| 2005/0069612 A1 | 3/2005 | Romanach et al. |
| 2005/0147724 A1 | 7/2005 | Schweinfurth |
| 2005/0157148 A1 | 7/2005 | Baker et al. |
| 2005/0163898 A1 | 7/2005 | Romanach et al. |
| 2005/0230420 A1 | 10/2005 | Smith et al. |
| 2005/0257716 A1 | 11/2005 | Mazzella et al. |
| 2006/0038866 A1 | 2/2006 | Wen et al. |
| 2006/0110551 A1 | 5/2006 | Shastry et al. |
| 2006/0182856 A1 | 8/2006 | Ornelaz |
| 2006/0228451 A1 | 10/2006 | Martin |
| 2006/0275529 A1 | 12/2006 | Woodhouse et al. |
| 2007/0098859 A1 | 5/2007 | Shastry et al. |

FOREIGN PATENT DOCUMENTS

| | | |
|---|---|---|
| CH | 662358 | 12/1978 |
| CH | 660750 | 6/1987 |
| EP | 0 475 075 | 11/1995 |
| EP | 705890 | 4/1996 |
| EP | 1611798 | 1/2006 |
| GB | 2277094 | 10/1994 |
| JP | 58 052375 A | 3/1983 |
| JP | 63063363 | 3/1988 |
| WO | WO 92/14795 | 9/1992 |
| WO | WO 95/27758 A | 10/1995 |
| WO | WO 97/17409 | 5/1997 |
| WO | WO 97/35933 | 10/1997 |
| WO | 00/03609 | 1/2000 |
| WO | WO 01/94116 | 12/2001 |
| WO | 02/085995 | 10/2002 |
| WO | 2004/003089 | 1/2004 |
| WO | 2004/012518 | 2/2004 |
| WO | 2004/080191 | 9/2004 |
| WO | 2005/002360 | 1/2005 |
| WO | 2005/006884 | 1/2005 |
| WO | 2005/027655 | 3/2005 |
| WO | 2005/079223 | 9/2005 |
| WO | 2005/086655 | 9/2005 |
| WO | 2005/113693 | 12/2005 |
| WO | 2005/122784 | 12/2005 |
| WO | 2006/023615 | 3/2006 |
| WO | 2006/086780 | 8/2006 |
| WO | 2006/086781 | 8/2006 |
| WO | 2006/121936 | 11/2006 |
| WO | 2007/005063 | 1/2007 |
| WO | 2007/109754 | 9/2007 |
| WO | 2007/115050 | 10/2007 |
| WO | 2007/130983 | 11/2007 |

OTHER PUBLICATIONS

Ingredient Statement: 6# Refined Glaze in Butylac; Origination Date: Jan. 9, 2004.

Ingredient Statement: 8# Esterified Shellac M-4; Origination Date Jan. 9, 2004.

Ingredient Statement: Certified R-100 Refined Bleached Shellac; Origination Date Jun. 25, 2001.

Ingredient Statement: Mantrolac R-100 in Propylene Glycol FG; Origination Date: Jan. 12, 2004.

Material Safety Data Sheet, Certified R-100 Refined Bleached Shellac, Mantrose-Haeuser Company, Origination Date: May 1, 2001.

Technical Information: 8# White French Varnish M-4. Mantrose-Bradshaw-Zinsser Group, Origination Date: Jan. 9, 2004.

Technical Information: Certified R-100 Refined Bleached Shellac. Mantrose-Bradshaw-Zinsser Group; Origination Date: Jan. 9, 2004.

Tolliver-Nigro, "Taking the Sting Out of No-Tox," Ink Maker (2003).

Database WPI Week 2001, Derwent Publications Ltd., London, GB; AN 2001-409143 (XP002348407), Li, Y: "High grade edible paint mimeograph," & CN 1 158 346 A (Li Y) (Sep. 3, 1997) abstract.

Aldrich Chemical, "Silsesquioxanes, Bridging the Gap Between Polymers and Ceramics," Chemfiles (2001) 1(6):1-14.

Universal Stenciling and Marketing Systems, Inc., "USMR Micro-Spray Markers All Models Owner's Manual," St. Petersburg, Florida (Sep. 2, 2004) 1-29.

* cited by examiner

FOOD GRADE INK JET INKS FOR PRINTING ON EDIBLE SUBSTRATES

CROSS-REFERENCE TO RELATED APPLICATIONS

The present patent application claims the benefit of U.S. provisional patent application Ser. No. 60/578,774, filed Jun. 10, 2004, the entire contents of which are hereby frilly incorporated by reference.

BACKGROUND

Ink jet printing is a printing application with the potential for wide use in decorating the surfaces of food items. However, in order to be suitable for use on foods, ink formulations should be food grade formulations, should be compatible with the food surfaces onto which they will be applied, and should have properties (e.g., viscosities, surface tensions, smear resistance, solubilities, drying times) that make them suitable for use with ink jet printers. Few presently available inks meet all of these limitations. For example, many ink jet ink formulations include compounds that cause deleterious health effects when ingested by humans. Other ink formulations have high water contents, resulting in viscosities that are too low to permit the inks to be successfully jetted onto an edible surface. Still other ink jet ink formulations are incapable of being printed directly onto a food substrate without smearing or image bleed. One solution that has been used to deal with this latter problem is to print a decoration onto an edible paper, such as rice paper, and then to apply the decorated paper to a food item. Unfortunately, this process involves multiple processing steps and is not well suited for use with food items of all shapes and sizes. Thus, a need exists for a food grade coloring formulation that can be printed directly onto the surfaces of a variety of food items to produce a high quality image using ink jet printing technology.

SUMMARY

Food grade colored fluids for use in printing on edible substrates, methods for applying the food grade colored fluids directly to edible substrates, and edible substrates having the colored fluids applied thereto are provided. The food grade colored fluids are typically made from food grade dyes and glycols and optionally water and/or glycerine. The food grade colored fluids have characteristics that render them suitable for printing directly onto the surfaces of a variety of edible substrates. In particular, the food grade colored fluids may be suitable for printing with ink jet printers, including piezoelectric ink jet printers. As used herein, the phrase "food grade" means that up to specified amounts of the particular compound can be ingested by a human without generally causing deleterious health effects. Examples of food grade compounds include those compounds "generally recognized as safe" ("GRAS") by the United States Food and Drug Administration ("FDA") and colorants approved by the FDA for use in foods for human consumption. In particular, food safe compounds include those compounds listed as approved under 21 C.F.R. §§ 73, 74, 172, 182 and 184.

The colored fluids may contain substantial amounts of food grade glycols, such as 1,2-propanediol. In some embodiments, the colored fluids include at least about 10 weight percent (wt. %) food grade glycol. This includes embodiments where the colored fluids include at least about 25 wt. % food grade glycol and further includes embodiments where the colored fluids include at least about 40 wt. % food grade glycol. In addition to the food grade glycols, the colored fluids may optionally include water, glycerine or a mixture of water and glycerine. In one typical embodiment, the food grade glycol and any water or glycerine present account for at least about 90 wt. % of the food grade colored fluid.

The food grade colored fluids may be prepared with a low water content. For example, in some embodiments the food grade colored fluids may contain no more than about 35 wt. % water. This includes embodiments where the colored fluids contain no more than about 20 wt. % water, further includes embodiments where the colored fluids contain no more than about 5 wt. % water. The food grade colored fluids may be free of or substantially free of water, e.g. having a water content of no more than about 1 wt. %. In these compositions, any water present may be due solely or partially to water absorbed from the air under humid conditions and/or water introduced as an impurity or minor component of one of the dyes or solvents that make up the colored fluids. It is advantageous to limit the amount of water present in the colored fluids because a high water content tends to decrease the viscosity of the fluids, rendering them less suitable for use in some printing applications, such as ink jet printing applications where elevated jetting temperatures are used.

Although not a necessary ingredient, glycerine is a useful co-solvent because many of the food grade dyes used in the colored fluids exhibit high solubility in glycerine. Typically, when glycerine is present, it makes up at least about 3 wt. % of the colored fluid. This includes embodiments where glycerine makes up at least about 10 wt. % of the colored fluid, further includes embodiments where glycerine makes up at least about 20 wt. % of the colored fluid, and still further includes embodiments where glycerine makes up at least about 30 wt. % of the colored fluid. The amount of glycerine present, if any, will depend on a variety of factors, including the extent to which the food grade dyes are soluble in the food grade glycols. Thus, some of the colored fluids may contain a relatively small amount of glycerine (e.g. about 2 to 10 wt. %) and others may contain a larger amount of glycerine (e.g. about 30 to 45 wt. %). In still other embodiments, glycerine is present in intermediate quantities (e.g. about 12 to 18 wt. %).

In certain embodiments, the food grade dyes include food grade dye; glycerine; at least about 25 wt. % 1,2-propanediol (and commonly at least about 50 wt. % 1,2-propanediol); and a surface tension modifier. In such colored fluids the 1,2-propanediol, glycerine and any optional water commonly make up at least about 90 wt. % of the colored fluid. Any water present generally makes up no more than about 35 wt. % of the colored fluid and more suitably, no more than about 10 wt. %. The surface tension modifier may include a sorbitan ester (e.g., one or more fatty acid monoesters of a polyoxyethylene sorbitan), fatty acid(s) such as a mixture of tall oil fatty acids, a fatty acid polyol partial ester (e.g., one or more polyglycerol fatty acid monoesters such as octaglycerol monooleate) and/or lecithins (e.g. hydroxylated lecithins).

The food grade dyes used to produce the colored fluids may include synthetic dyes, natural dyes, or combinations thereof. As used herein, the term "dye" denotes dyes which are soluble in water and/or in the other cosolvents, which contain substantial amounts of glycols and/or glycerine, employed in the present colored fluids. In some embodiments, the colored fluids may be substantially free of insoluble materials. Suitable synthetic dyes for use in the present coloring fluids include food grade FD&C dyes, such as FD&C Red #3, FD&C Red #40, FD&C Yellow #5, FD&C Yellow #6, FD&C Blue #1, and FD&C Green #3. Suitable natural dyes include turmeric oleoresins, cochineal extracts, gardenia extracts, and natural colors derived from vegetable juices. Other specific examples of suitable natural dyes include, but are not limited to, beet extract, grape skin extract, and chlorophyll containing extracts (e.g. nettle extract, alfalfa extract and spinach extract). To achieve a desired color tint or shade, the colored liquids may include mixtures of more than one synthetic and/or natural food grade dye. In a typical embodiment, the colored fluids contain about 0.1 to 10 wt. % food grade dye on a dissolved solids basis (dsb). This includes embodiments where the colored fluids contain about 0.5 to 7.5 wt. % (dsb) food grade dye and further includes embodiments where the colored fluids contain about 0.5 to 5 wt. % (dsb) food grade dyes.

Because they are intended for use on edible substrates, the colored fluids are desirably made with high purity food grade dyes. For example, the food grade dyes used in the colored fluids may be at least about 85 wt. % pure. That is, the dyes may contain no more than about 15 wt. % contaminants and impurities, including moisture. In some instances, the food grade dyes are at least about 87 wt. % pure. Alternatively, the purity of the dyes may be analyzed on a strictly dry weight basis, in which case the food grade dyes are desirably at least about 92 wt. % pure. In some embodiments the food grade dyes are at least about 95 wt. % pure when analyzed on a dry weight basis. This includes embodiments where the food grade dyes are at least about 98 wt. % pure when analyzed on a dry weight basis.

Inorganic salts, such as sodium chloride and sodium sulfate, are examples of common impurities found in food grade dyes, such as food grade FD&C dyes. Unfortunately, fluids having elevated salt contents may be corrosive to printer parts and lead to shorter printer lifetimes. Therefore, it is typically advantageous to use food grade dyes having a low inorganic salt content, or at least a low chloride and/or sulfate ion content, in the preparation of the colored fluids. In some exemplary embodiments, the colored fluids contain one or more synthetic food grade dyes having an inorganic salt content, and more specifically in some instances a chloride and/or sulfate ion content, of no more than about 0.5 wt. %. This includes embodiments where the colored fluids contain one or more synthetic food grade dyes having an inorganic salt content, or at least a chloride and/or sulfate ion content, of no more than about 0.2 wt. % desirably no more than about 0.1 wt. %. The salt (e.g. chloride and or sulfate ion) impurity level in the synthetic food grade will desirably be no more than about 1000 ppm. In some embodiments, the chloride and/or sulfate level will be no more than about 500 ppm and in still other embodiments the chloride and/or sulfate level will be no more than about 100 ppm.

In addition to food grade dyes and glycols and any optional glycerine and/or water, the food grade colored fluids may contain various food grade additives, such as surface tension modifiers, thickening agents, antioxidants, preservatives, buffering agents, and antimicrobial agents. These additional additives are typically present in small quantities, for example, no more than about 10 wt. % and desirably no more than about 5 wt. %. Lower alcohols (i.e. alcohols having one to six carbon atoms), such as isopropanol, ethanol, n-butyl alcohol, and i-butyl alcohol, or mixtures thereof are examples of additives that might be present in limited amounts in the colored fluids. The lower alcohols may be used as surface tension modifiers and will generally be present in amounts of no more than about 10 wt. %. This includes embodiments where the lower alcohols are present in amounts of no more than about 5 wt. % and further includes embodiments where the lower alcohols are present in amounts of no more than about 0.5 wt. %.

The colored fluids desirably have properties that render them suitable for use as printing inks in various types of printers, including ink jet printers which utilize piezoelectric printheads. Viscosity is one property of the colored fluids that may be controlled to produce fluids suitable for ink jet printing. It is generally desirable for the colored fluids to have a viscosity of about 8 to 14 centipoise (cps) at the jetting temperature at which the printing is to take place. In some embodiments, the colored fluids have a viscosity of 8 to 14 cps at the desired jetting temperature. Typical jetting temperatures may range from room temperature, about 25° C., to elevated temperatures of at least about 80° C. or even higher. Typical elevated jetting temperatures may range from about 50 to 70° C. For example, a colored fluid may have a viscosity of about 8 to 14 cps at a jetting temperature of 60° C. Alternatively, a colored fluid may have a viscosity of about 8 to 14 cps at a jetting temperature of 25° C.

The colored fluids presented herein desirably, but not necessarily, exhibit Newtonian viscosities, that is, viscosities that do not change with shear rate. In particular, the colored fluids may exhibit a Brookfield viscosity that changes by no more than about 2 cps with a shear rate increase from about 15 to 45 rpm when measured at a temperature selected from a temperature in the range of 20 to 70° C. (e.g., 60° C.). In some embodiments, the colored fluids exhibit a Brookfield viscosity that changes by no more than about 1 cps and in still other embodiments, the colored fluids exhibit a Brookfield viscosity that changes by no more than about 0.5 cps with a shear rate increase from about 15 to 45 rpm when measured at a temperature selected from a temperature in the range of 20 to 70° C. (e.g., 60° C.).

The colored fluids will typically have surface tensions of about 20 to 60 dynes per centimeter (cm) at 25° C. This includes embodiments where the colored fluids have surface tensions of about 25 to 50 dynes per cm at 25° C. The surface tensions of the colored fluids may be lowered by using surface tension modifiers. Suitable surface tension modifiers for use in the colored fluids include, but are not limited to, sorbitan esters (e.g. polyoxyethylene sorbitan esters), fatty acids (e.g. tall oil fatty acids), mixtures of fatty acids, esters of fatty acids (e.g. polyglycerol esters of fatty acids) and lecithins. Using these surface tension modifiers, food grade colored fluids having surface tensions of no more than about 40 dynes per cm, more suitably no more than about 38 dynes per cm at 25° C. and desirably no more than about 35 dynes per cm at 25° C. may be prepared. Typically, the colored fluids will contain no more than about 10 wt. % surface tension modifier and desirably no more than about 5 wt. % surface tension modifier. For example, the colored fluid may include about 0.05 to about 3 wt. % of a sorbitan ester, e.g., a polyoxyethylene sorbitan ester such as polyoxyethylene sorbitan monopalmitate and/or polyoxyethylene sorbitan monolaurate. In other embodiments, the colored fluid may include about 1 to about 5 wt. % of a mixture of fatty acids, e.g., tall oil fatty acids, such as a mixture of oleic acid and linoleic acid. In yet other embodiments, the colored fluid may include about 0.1 to about 3 wt. % of a fatty acid monoester of a polyglycerol (e.g., octaglycerol), such as octaglycerol monooleate.

Other suitable surface tension modifiers for use in the present colored fluids include lecithins and, in particular, lecithins that have been deoiled and modified to enhance their water solubility (i.e., lecithins having an enhanced HLB value). Examples of suitable lecithins include hydroxylated lecithin (e.g., hydroxylated soy lecithin), enzyme modified lecithin (e.g., enzyme modified soy lecithin) and acetylated, hydroxylated lecithin. Embodiments of the colored fluid may include about 0.1 to about 3 wt. % of a modified lecithin, such as a lecithin having an HLB value of at least about 9, e.g., about 0.3 to about 2 wt. % hydroxylated soy lecithin.

To prevent clogging of ink jet printer nozzles it is advantageous to provide colored fluids having reduced particle content. Particle content may be characterized by the silt density index (SDI) of the fluid. SDI values provide a measure of particle content that relates the rate of membrane clogging to the quantity of particulate matter present in a fluid. SDI values may be measured as follows: two aliquots of equal volume of the fluid to be tested are poured sequentially into a filter and the time required for each aliquot to pass through the filter is measured. The SDI is provided by the ratio of the time it takes the first aliquot to pass through the filter to the time it takes the second aliquot to pass through the filter. A higher SDI value indicates a fluid having a lower particle content. A fluid that has no buildup on the filter, and therefore very little particle content, will have an SDI value of 1. The food grade colored fluids provided herein include, but are not limited to, fluids having an SDI of at least about 0.5. In certain embodiments the colored fluids have an SDI of at least about 0.75. This includes embodiments where the colored fluids have an SDI of at least about 0.9.

Unless otherwise noted, an SDI value for a given liquid sample may be measured at any arbitrary time after the sample is prepared without requiring any particular set of processing conditions to have been preformed prior to the measurement. In some cases, see Example 1 below, a Heat Test SDI value is quoted. As used herein, a Heat Test SDI value is measured after heat-aging the sample for at least 11 days at a temperature of at least 70° C. according to the procedure described in Example 1.

The food grade colored fluids may also have a relatively low specific gravity. In a typical embodiment, the food grade colored fluids may have a specific gravity of no more than 1.15. This includes embodiments where the colored fluids have a specific gravity of no more than 1.13 and further includes embodiments where the colored fluids have a specific gravity of no more than 1.10.

Once prepared, the present colored fluids may be printed directly onto the surfaces of a variety of edible substrates using conventional printing equipment, such as ink jet printers. The surfaces onto which the fluids are printed are desirably porous in order to facilitate absorption of the dye by the surface. Suitable edible substrates include, but are not limited to, crackers, chewing gum, biscuits, cereal, taco shells, granola bars, rice cakes, cookies, pie crusts, waffles, cakes, including snack cakes, marshmallows, candies, pasta and various bread products, such as toast, buns, bagels and tortillas.

DETAILED DESCRIPTION

Food grade colored fluids are provided. The food grade colored fluids, which contain at least one food grade dye and a food grade glycol, such as 1,2-propanediol, are useful for printing directly onto the surfaces of various edible substrates. As used herein, "food grade" means that up to specified amounts of the particular compounds can be ingested by a human without generally causing deleterious health effects. Therefore, in order to meet the standard of a "food grade" colored fluid, the colored fluid should be free or substantially free of compounds that generally cause deleterious health effects when ingested by a human. When such compounds are present, e.g. in trace amounts through contamination, those compounds should be present in amounts below those that would result in the deleterious health effects.

The food grade colored fluids are well-suited for use with a variety of ink jet piezo printheads. Examples of manufacturers from which the printheads may be obtained include Spectra, Xaar, Hitachi and PicoJet.

Edible substrates onto which the colored fluids have been applied are also provided. Examples of edible substrates onto which the food grade colored fluids may be printed include, but are not limited to, crackers, chewing gum, biscuits, cereal, taco shells, granola bars, rice cakes, cookies, pie crusts, waffles, cakes, including snack cakes, marshmallows, candies, pasta, and various bread products such as toast, buns, bagels, and tortillas. This surface of the edible substrate onto which the food grade colored fluids are applied is desirably a porous surface which facilitates the absorption of the food grade colored fluids by the surface, hastening drying. As used herein, the term "porous surface" is intended to include any surface having sufficient porosity to allow the food grade colored fluids to be at least partially absorbed. The food grade colored fluids may also be applied to nonporous edible surfaces, however, the application of the colored fluids to such surfaces may require a drying step after the colored fluid has been applied.

The food grade glycol acts as a solvent and may account for a large part of the colored fluid. For example, the food grade glycol may account for at least about 25 wt. % of the colored fluid. This includes embodiments where the food grade glycol accounts for at least about 40 wt. % of the colored fluid, further includes embodiments where the food grade glycol accounts for at least about 70 wt. % of the colored fluid, and still further includes embodiments where the food grade glycol accounts for at least about 85 wt. % of the colored fluid. Optionally, glycerine, water, or a mixture of glycerine and water, may be used as co-solvents along with the food grade glycol. However, in many colored fluids the amount of water present in the colored fluids may be limited in order to maintain a higher viscosity. For some applications, higher viscosities may be advantageous because they can render the colored fluids suitable for ink jet printing at elevated jetting temperatures.

Glycerine is a good co-solvent of choice because of its relatively low volatility and its presence may assist in solubilizing some of the food grade dyes. As such, glycerine helps prevent the food grade dyes from solidifying out of solution, crusting onto and clogging jetting nozzles. When glycerine is used as a co-solvent, it is typically present in an amount of at least about 3 wt. %. This includes embodiments where glycerine is present in an amount of at least 10 wt. %, further includes embodiments where glycerine is present in an amount at least about 20 wt. %, still further includes embodiments where the glycerine is present in an amount of at least 30 wt. %, and even further includes embodiments where the glycerine is present in an amount of at least about 45 wt. %. In one exemplary embodiment, the food grade colored fluids contain at least about 70 wt. % 1,2-propanediol, glycerine or a mixture thereof. In another exemplary embodiment, the food grade colored fluids contain about 25 to 95 wt. % 1,2-propanediol, about 3 to 40 wt. % glycerine and no more than about 35 wt. % water.

The food grade dyes used to produce the colored fluids may be synthetic dyes, natural dyes or a mixture of synthetic and natural dyes. The food grade dyes may include any dyes which are soluble in at least one of 1,2-propanediol, glycerine, water, or mixtures thereof. In some embodiments, it is desirable that the food grade colored fluids be free of insoluble coloring agents such as a pigments or lakes. Examples of suitable dyes include, but are not limited to, synthetic dyes, such as FD&C dyes (e.g., FD&C Red #3, FD&C Red #40, FD&C Yellow #5, FD&C Yellow #6, FD&C Blue #1, and/or FD&C Green #3).

Examples of suitable natural dyes include, but are not limited to, turmeric oleoresins, cochineal extracts including carminic acid, gardenia extracts, beet extracts, and other natural colors derived from vegetable juices, and chlorophyll-containing extracts, such as nettle extract, alfalfa extract and spinach extract. Anthocyanins are another class of food grade dyes that may be used in the colored fluids. The anthocyanins may be derived from a variety of plant sources, including fruit juices, elderberries, black currants, chokeberries, vegetable juices, black carrots, red cabbage, grapes and grape skins, and sweet potatoes. Although the relative amount of the food grade dyes used in the food grade colored fluids may vary depending on the desired color, shade and intensity, the food grade colored fluids will typically contain about 0.1 to 10 wt. % (dsb) food grade dye. This includes embodiments where the colored fluids contain about 0.5 to 7.5 wt. % (dsb), and further includes embodiments where the colored fluids contain about 0.5 to 5 wt. % (dsb) food grade dye.

The food grade dyes used to produce the colored fluids are desirably high purity food grade dyes. In some instances, the food grade dyes may possess purities of at least 85 wt. %, where any water present in the dye is included as an impurity. This includes embodiments where the food grade dyes are at least 87 wt. % pure. When the purity of the dye is analyzed strictly on a dry weight basis, the food grade dyes desirably have a purity of at least 92 wt. %. This includes embodiments where the food grade dyes have a purity of at least about 95 wt. % and still further includes embodiments where the food grade dyes have a purity of at least about 98 wt. % when analyzed on a dry weight basis. Typical impurities found in commercially available food grade dyes, including many FD&C dyes, may include minerals, such as calcium, metals, such as iron, salts such as sodium chloride and sodium sulfate, and small amounts of water. Typically, the impurity level of minerals and metals in the food grade dyes will be no more than about 50 ppm. However, in some instances, the impurity levels of these components will be much less. For example, in some of the food grade dyes, the impurity level of calcium will be no more than about 10 ppm and desirably no more than about 5 ppm. Similarly, in many suitable food grade dyes, the impurity level of iron will be no more than about 10 ppm and desirably no more than about 4 ppm. Water will typically be present as an impurity in the food grade dyes in an amount of no more than about 5 wt. %. This includes embodiments where water is present as an impurity in an amount of no more than about 2 wt. % and still further includes embodiments where water is present as an impurity in the food grade dyes in an amount of no more than about 1 wt. %.

Some inorganic salts are particularly undesirable impurities because these salts tend to corrode printer parts, including printing heads which reduces the lifetime of the printers used to apply the dyes. Therefore, for certain applications it may be advantageous to reduce the level of inorganic salt impurities in the food grade dyes. When a mixture of food grade dyes is utilized, a reduction in inorganic salt content and corrosiveness may be achieved provided at least one of the food grade dyes, and in particular at least one FD&C food grade dye, has a low inorganic salt content (as a percentage of total solids content in the dye). It such embodiments, it may be desirable for any food grade dyes that do not have a low salt content to be present in amounts of no more than about 1 wt. % or in amounts of no more than about 0.6 wt. %. In some colored fluids containing a mixture of food grade dyes, all of the food grade dyes in the mixture have a low inorganic salt content. In some embodiments the food grade colored fluids provided herein are made with one or more synthetic food grade dyes having an inorganic salt impurity level of no more than about 0.5 wt. %. This includes embodiments where one or more of the synthetic food grade dyes has an inorganic salt content of no more than about 0.2 wt. % and further includes embodiments where one or more of the synthetic food grade dyes has an inorganic salt content of no more than about 0.1 wt. %. Alternatively stated, in some instances, the inorganic salt impurity level in one or more of the synthetic dyes will be no more than about 1,000 ppm. In other instances, the inorganic salt impurity level in one or more of the synthetic food grade dyes will be no more than about 500 ppm and in still other instances the inorganic salt impurity level in one or more of the synthetic dyes will be no more than about 100 ppm. Two typical corrosive inorganic salts found in commercially available dyes, including synthetic dyes, such as FD&C food grade dyes are chlorides, which usually take the form of sodium chloride, and sulfates, which typically take the form of sodium sulfates. In some instances it may be possible for the colored fluids to include higher levels of certain less corrosive salts provided the levels of chlorides and/or sulfates in the dyes remains low. The impurity limits cited above with respect to chloride and sulfate levels refer specifically to the amount of chloride and/or sulfate ion content in the colored fluids. Table 1 below shows exemplary formulations for two high-purity, low-salt food grade dyes that my be used to produce the food grade colored fluids. Both dyes shown in Table 1 are available from Sensient Colors Inc., St. Louis, Mo.

TABLE 1

| Low Inorganic Salt Food Grade Dyes | | |
|---|---|---|
| | Low Salt FD&C Yellow | Low Salt FD&C Blue 1 |
| Calcium | 5 ppm | — |
| Iron | 4 ppm | — |
| Water | — | 3.6 wt. % |
| NaCl | 25 ppm | 2 ppm |
| Na$_2$SO$_4$ | 51 ppm | 34 ppm |
| Dye | 95 wt. % | 95 wt. % |

In addition to the food grade dyes and glycols and any optional glycerine and/or water co-solvents, the food grade colored fluids may contain other food grade additives such as surface tension modifiers, thickening agents, antioxidants, preservatives, buffering agents, and anti-microbial agents. These additional additives will typically be present only in small quantities. For example, the additional food grade additives may be present in amounts of no more than about 10 wt. %. This includes embodiments where the food grade additives are present in amounts of no more than about 5 wt. % and further includes embodiments where the food grade additives are present in amounts of no more than about 3 wt. %. The additives may include isopropanol, ethanol, or mixtures thereof as surface tension modifying agents. In a typical embodiment, a colored fluid may contain no more than about 10 wt. % isopropanol, ethanol, or a mixture thereof and more typically about 1 to 5 wt. %. The colored fluids may contain no more than about 3 wt. % lower alcohol and in some embodiments the colored fluids may be substantially free of lower alcohol, such as isopropanol, i.e., contain no more than about 0.5 wt. % lower alcohol. Methylparaben, propylparaben or mixtures thereof may be included in the food grade colored fluids as preservatives. For some applications it is desirable to exclude certain additives. For example, some food grade colored liquids in accordance with this disclosure may be free of or substantially free of one or more of the following additives: glycol ethers, polyol monoethers, urea, tetraalkylammonium cations (e.g. tetramethylammonium cations), alkanol ammonium compounds (e.g., monoethanol ammonium compounds, diethylammonium compounds, or triethanol ammonium cations), cationic amide compounds (e.g., protonated formamide), silica, sebacyl chlorides, binding agents and film-forming agents. A food grade colored fluid is "substantially free of" an additional food grade additive if the colored fluid contains no more than about 0.5 wt. % of the additional food grade additive. In some instances, the food grade colored fluid contains no more than about 0.2 wt. % of a given additive. In still other instances the food grade colored fluid contains no more than about 0.1 wt. % of a given additive. For example, it may be desirable to have food grade colored fluids which contain no more than about 0.05 wt. % binding agents and/or film-forming agents, such as polymers, gum arabic, hydrocolloids, xanthum gum, waxes, alginates and polysaccharides.

For ink jet printing applications, it is generally desirable for the colored fluids to have a viscosity of about 8 to 14 centipoise (cps) at the jetting temperature at which the printing is to take place. This includes embodiments where the colored fluids have a viscosity of 8 to 12 cps at the desired jetting temperature. Some ink jet printers are designed to be operated at ambient temperatures (i.e. about 25° C.). Other ink jet printers are designed for operation at elevated print head temperatures. For example, an ink jet printer may operate at jetting temperatures ranging from about 50 to 70° C. Therefore, the formulation of the colored fluids, including the ratio of food grade glycol to glycerine and the amount of water present, is desirably controlled to provide a suitable viscosity for the intended jetting temperature. For example, a colored fluid may be tailored to have a viscosity of about 8 to 14 cps at a jetting temperature of 60° C. However, the viscosity of these colored fluids may be significantly higher at ambient temperatures. For example, the colored fluids may have viscosities of about 35 to 65 cps at 25° C. Alternatively, a colored fluid may be tailored to have a viscosity of about 8 to 14 cps at a jetting temperature of 25° C.

It has been discovered that colored fluids exhibiting Newtonian viscosities, perform favorably as printing inks for edible substrates. Thus, in some embodiments, the colored fluids have Newtonian viscosities. Specifically, the colored fluids may exhibit a Brookfield viscosity that changes by no more than about 2 cps with a shear rate increase from about 15 to 45 rpm at 60° C. In some embodiments, the colored fluids exhibit a Brookfield viscosity that changes by no more than about 1 cps and in still other embodiments, the colored fluids exhibit a Brookfield viscosity that changes by no more than about 0.5 cps with a shear rate increase from 15 to 45 at 60° C.

The surface tension of the colored fluids may vary over a relatively wide range, provided it is suitable to allow the colored fluids to be jetted through an ink jet printing head and printed onto the surface of an edible substrate. In some embodiments, the colored fluids will have surface tensions of about 20 to 60 dynes per cm at 25° C. This includes embodiments where the colored fluids have surface tensions of 35 to 50 dynes per cm at 25° C.

In some instances, surface tension modifiers may be included in the colored fluids to lower their surface tensions. Sorbitan esters are an example of a type of surface tension modifier that may be used in the colored fluids. Suitable sorbitan esters include polyoxyethylene sorbitan esters. Food grade polyoxyethylene sorbitan esters are commercially available under the tradename Tween®. These include Tween® 80 (polyoxyethylene sorbitan monooleate); Tween® 65 (polyoxyethylene sorbitan tristearate); Tween® 60 (polyoxyethylene sorbitan monostearate); Tween® 40 (polyoxyethylene sorbitan monopalmitate); and Tween® 20 (polyoxyethylene sorbitan monolaurate). Fatty acids, such as tall oil fatty acids, and mixtures of fatty acids may also be employed as surface tension modifiers in the food grade colored fluids. Acintol (also known as Sylfat® FA-1), a fatty acid mixture available from Arizona Chemical (Panama City, Fla.) is an example of a suitable surface tension modifier. Acintol is a mixture of about 40-45 wt. % oleic acid and 40-45 wt. % linoleic acid (conjugated and nonconjugated). Esters of fatty acids, such as polyglycerol esters of fatty acids, are another group of surface tension modifiers that may be added to the colored fluids. Santone® 8-1-0, octaglycerol monooleate (available from Loders Croklaan, Netherlands) is one example of a food grade polyglycerol ester suitable for use as a surface tension modifier.

Other suitable surface tension modifiers for use in the present colored fluids include lecithins and, in particular, lecithins that have been deoiled and modified to enhance their water solubility (i.e., lecithins having a relatively high HLB value). Examples of suitable lecithins include hydroxylated lecithin (e.g., hydroxylated soy lecithin), enzyme modified lecithin (e.g., enzyme modified soy lecithin) and acetylated, hydroxylated lecithin. Embodiments of the colored fluid may include about 0.1 to about 3 wt. % of a modified lecithin, such as a lecithin having an HLB value of at least about 9, e.g., about 0.3 to about 2 wt. % hydroxylated soy lecithin. One example of a commercially available lecithin material that may be used in the colored fluids provided herein is sold under the tradename Yelkin® 1018 (ADM, Decatur, Ill.).

Lecithin material may be obtained in many forms and a variety of common natural forms of lecithin material have been observed. In commercial practice, products such as soy lecithin material include primarily 3 or 4 of the possible forms and are commonly sold as unfractionated mixtures. Lecithin material from different sources may be made up of different mixtures. The properties of these mixtures can be modified by chemical and/or enzymatic treatments to alter the hydrophilic-hydrophobic balance as desired for the final intended use. One example of such a modification is oxidation with oxygen, which ultimately results in a lecithin that contains hydroxyl groups on the lipid side chains of the diglyceride moiety. This decreases the hydrophobicity of the lecithin and increases the overall polarity of the molecule.

Surfactants, which can act as surface tension modifiers, may be characterized with reference to their hydrophobic-lipophilic balance (HLB) number. The HLB number correlates roughly with the solubility of the surfactant in water, with more water soluble materials typically having a higher HLB value. Suitable lecithins for use in the present ink jet inks typically include no more than about 5 wt. % oil and have an HLB number of at least about 9, or, more desirably, at least about 10.

In one embodiment, the lecithin material used in the present colored fluid formulations may often be characterized as having high polarity, high water-solubility and relatively high HLB (e.g., an HLB of at least about 7 and more suitably, an HLB of at least about 9). Examples of such materials include hydroxylated lecithin material, acetylated lecithin material, and the like. Table 15 below shows HLB values for a number of commercial lecithin materials. Lecithin material having these characteristics can be made by a process which includes one or more of the known methods of modifying lecithin materials (e.g., physical, chemical, enzymatic, irradiation, etc.). Physical modification refers to blending or co-extruding lecithin materials of different characteristics to provide the desired resulting characteristics. Exposure to high-energy ionizing radiation such as cobalt-60 gamma rays, X-rays and electron beams or to UV radiation in the presence of photosensitizers and oxygen or other atmospheres, may also be used to produce modified lecithin materials characterized by higher polarity and/or higher water-solubility. For example, the lecithin material may be hydroxylated soy lecithin material.

TABLE 15

HLB Value of Selected Commercial Lecithins

| Lecithin Material | HLB Value |
|---|---|
| Unmodified lecithin | 4–6 |
| Acetylated lecithin | 7–8 |
| Enzyme modified lecithin | 8–9 |
| Hydroxylated lecithin | 10–12 |

Using these surface tension modifiers, food grade colored fluids having surface tensions of less than about 40 dynes per cm at 25° C. may be prepared. This includes embodiments where the colored fluids have a surface tension of no more than about 38 dynes per cm at 25° C., further includes embodiments where the colored fluids have a surface tension of no more than about 35 dynes per cm at 25° C. and still further includes embodiments where the colored fluids have a surface tension of no more than about 32 dynes per cm at 25° C.

The surface tension modifiers are desirably added in small quantities to the food grade colored fluids. For example, in some of the food grade colored fluids provided herein, surface tension modifiers make up no more than about 10 wt. % of the colored fluid. This includes embodiments where surface tension modifiers make up no more than about 5 wt. % of the colored fluid, further includes embodiments where surface tension modifiers make up no more than about 2 wt. % of the colored fluid and still further includes embodiments where surface tension modifiers make up no more than about 1 wt. % of the colored fluid. For example, some of the food grade colored fluids provided herein will contain about 0.05 to 5 wt. % surface tension modifier.

In some instances, food grade colored fluids containing surface tension modifiers will contain no more than about 10 wt. % water and desirably no more than about 5 wt. % water.

The food grade colored liquids desirably have relatively low particle contents. As such, some of the colored liquids are solutions of one or more food grade dyes that filterable through a 0.2 µm filter. One measure of the level of particle content may be provided by the silt density index of the colored fluids, which is desirably close to 1. The food grade colored fluids provided herein include, but are not limited to, fluids having an SDI of at least about 0.5. In certain embodiments the colored fluids have an SDI of at least about 0.75. This includes embodiments where the colored fluids have an SDI of at least about 0.9 and still further includes embodiments where the colored fluids have and SDI of at least about 0.95.

Low specific gravity may be advantageous in some applications. In a typical embodiment, the food grade colored fluids may have a specific gravity of no more than 1.13. This includes embodiments where the colored fluids have a specific gravity of no more than 1.10 (e.g., about 1.00 to 1.10).

The pH values of the food grade colored fluids is not critical, however it may be advantageous to provide colored fluids with an apparent pH of at least about 4 and desirably at least 5 to prevent the colored fluids from corroding printer parts.

Generally, the colored fluids include, but are not limited to, those having an apparent pH in the range of about 4 to 9. This includes colored fluids having an apparent pH in the range of about 5 to 8. Apparent pH values may be read directly from any suitable, commercially available pH meter. Although these apparent pH values may not be interpreted as an index of hydrogen ion potential nor used in equilibrium computations, they are reproducible and useful for qualitative purposes.

The following illustrative embodiments are intended to further exemplify the food grade colored fluids. These embodiments should not be interpreted as limiting the scope of the colored fluids disclosed herein.

A food grade colored fluid containing a food grade dye, about 25 wt. % of a food grade glycol, which may be 1,2-propanediol, optionally glycerine and optionally water is provided. In this colored fluid, the food grade glycol and any optional glycerine and water make up at least about 90 wt. % of the colored fluid, and any water present makes up no more than about 35 wt. % of the colored fluid.

The above-described colored fluid may be further defined by a variety of additional ingredients, properties and range limitations to provide a number of different embodiments of the food grade colored fluids. A few of these embodiments will now be described in more detail. In one embodiment of the above-described colored fluid, the food grade glycol makes up at least about 40 wt. % of the colored fluid. When glycerine is present, the colored fluid may contain at least about 3 wt. % glycerine. In applications where it is desirable to limit the amount of water present, water may make up no more than about 20 wt. % of the colored fluid. In other formulations, the water may account for an even smaller fraction of the colored fluid. For example, any water present may make up no more than about 1 wt. % of the colored fluid. A specific embodiment of the above-described colored fluid may contain about 0.5 to 7.5 wt. % of the food grade dye. The food grade dye in the colored fluid may be FD&C Red #3, FD&C Red #40, FD&C Yellow #5, FD&C Yellow #6, FD&C Blue #1 or a mixture thereof. The colored fluid may include one or more synthetic food grade dyes having an inorganic salt content of no more than about 0.5 wt. %. The colored fluid may also contain a food grade natural dye instead of or in combination with one or more synthetic dyes. The colored fluid may have one or more the following properties: a viscosity of about 8 to 14 cps at 60° C., a surface tension of about 20 to 60 dynes per cm at 25° C., a specific gravity of no more than about 1.13, a silt density index of at least about 0.5, and a Brookfield viscosity at 60° C. that changes by no more than 2 cps over a shear rate range from about 10 to 45 rpm.

A food grade colored fluid containing about 0.1 to 10 wt. % food grade dye, about 25 to 95 wt. % 1,2-propanediol, about 1 to 50 wt. % glycerine, and no more than about 35 wt. % water is provided. This colored fluid has a viscosity of about 8 to 14 cps at 60° C.

A food grade colored fluid containing a food grade dye, a food grade glycol, optionally glycerine and optionally water is provided. In this colored fluid the food grade glycol and any optional glycerine and water make up at least about 90 wt. % of the colored fluid and any water present makes up no more than about 35 wt. % of the colored fluid. The colored fluid is characterized by a Brookfield viscosity at 60° C. that changes by no more than 2 cps over a shear rate range from about 10 to 45 rpm. In one embodiment, the colored fluid contains at least about 25 wt. % 1,2-propanediol as the food grade glycol. The colored fluid may have a surface tension of about 35 to 50 dynes per cm at 25° C. and/or a viscosity of about 35 to 65 cps at 25° C.

A food grade colored fluid comprising a food grade dye and at least about 25 wt. % 1,2-propanediol is provided. The food grade dye in the colored fluid has an inorganic salt content of no more than about 0.5 wt. %. The food grade colored fluid may optionally include glycerine. In some embodiments, the colored fluid contains at least about 70 wt. % 1,2-propanediol, glycerine or a mixture thereof. The colored fluid may have a viscosity of about 35 to 65 cps at 25° C.

A food grade colored fluid comprising a food grade dye and at least about 70 wt. % 1,2-propanediol, glycerine or a mixture thereof is provided. This colored fluid has a viscosity of about 35 to 65 cps at 25° C. The amount of 1,2-propanediol in the colored fluid may be substantial. For example, the colored fluid may contain at least about 40 wt. % 1,2-propanediol. This includes embodiments where the colored fluid contains at least about 85 wt. % 1,2-propanediol. Glycerine may be present in the colored fluid in amounts of about 2 to 10 wt. %. Alternatively, glycerine may be present in amounts of about 35 to 45 wt. %. The colored fluid may further include isopropanol, ethanol or a mixture thereof. Methylparaben, propylparaben or a mixture thereof may also be present in the colored fluid. In applications where a low water content is desirable, the colored fluid may contain no more than about 20 wt. % water. This includes embodiments where the colored fluid contains no more than about 1 wt. % water. The colored fluid may contain one or more of the following synthetic food grade dyes, FD&C Red #3, FD&C Red #40, FD&C Yellow #5, FD&C Yellow #6, or FD&C Blue #1. In embodiments where the colored fluid contains one or more synthetic food grade dyes, one or more of those dyes may have an inorganic salt content of no more than about 0.5 wt. %. This includes embodiments wherein at least one synthetic food grade dye has a chloride content (as sodium chloride) of no more than about 1000 ppm and a sulfate content (as sodium sulfate) of no more than about 1000 ppm. The colored fluid may also contain a natural food grade dye. The natural dye may include one or more the following dyes: a turmeric oleoresin, a cochineal extract, gardenia yellow, gardenia blue, or beet powder. The colored fluid may have one or more of the following properties: a viscosity of about 8 to 14 cps at 60° C., a surface tension of about 35 to 50 dynes per cm at 25° C., a silt density index of at least about 0.5, a specific gravity of no more than about 1.13, or a specific gravity of no more than about 1.10.

A method of applying an edible colorant to a surface of an edible substrate, by ink jet printing any one of the above-described food grade colored fluids directly onto the surface of the edible substrate is provided. The ink jet printing may take place at a range of jetting temperatures. For example, the ink jet printing may take place at a jetting temperature of about 25 to 75° C. This includes methods of printing where the ink jet printing takes place at a jetting temperature of about 50 to about 70° C. One or more piezoelectric print heads may be used in the printing process.

An edible substrate having any one of the above-described food grade colored fluids applied to one or more surfaces thereof is also provided.

EXAMPLES

Exemplary embodiments of the present food grade colored fluids are provided in the following examples. The following examples are presented to illustrate the present food grade colored fluid and methods for applying the colored fluids to edible substrates and to assist one of ordinary skill in making and using the same. The examples are not intended in any way to otherwise limit the scope of the invention.

Instrumentation and Measurements

Examples 1 through 5 below provide examples of various food grade colored fluids. The formulations (in weight percent) and several physical characteristics of the fluids are provided in Tables 2-8. The physical characteristics presented in the tables were measured as follows. Viscosity measurements were obtained using a Brookfield Programmable LVDV II$^+$ Digital Calculating Viscometer and a Brookfield DV III Rheometer Model V3.3LV with ULA spindle manufactured by Brookfield Engineering Laboratories, Inc., Middleboro, Mass. Surface tension measurements were made using the DuNuoy Ring tensiometer method. The DuNuoy Ring tensiometer (Fisher Model 20 manual DuNuoy Ring Tensiometer or CSC Model 70535) may be obtained from Fisher Scientific or CSC Scientific Co., Fairfax, Va. or from companies such as Cole Palmer or VWR. Absorbance measurements were obtained with a Perkin Elmer Lambda 2 UV/Visible Spectrometer. Specific gravity was measured with a weight per gallon cup which meets ASTM methods. A weight per gallon cup accommodates 8.321 grams of water at 77.0 degrees ° F. (25° C.). The apparent pH values were read directly from an Orion Model 420A electronic pH meter with an Orion 91-55 electrode, after calibrating the instrument with appropriate buffers and immersing the electrode into the colored fluids.

SDI measurements were obtained using a modified ASTM D4189-82 protocol for SDI of water. SDI testing is a method that relates the rate of membrane plugging or clogging to the quantity of particulate matter in the fluid. In the modified procedure, designated "Heat Test SDI" in the tables, a stainless steel filter funnel (25 mm, 50 ml bowl capacity) was placed over a 250 ml filter flask hooked up to a vacuum and a vacuum gauge. A Pall Versapor® 25 mm, 0.45 μm membrane filter disk was placed in the filter funnel and pre-moistened with a few drops of the fluid to be tested. The vacuum pressure was set to 23 in. of mercury. The fluid to be tested was heat aged for 11 days at 70° C. Heat-aging is not necessary to determine the SDI of the colored fluids. SDI may be measured substantially immediately after the colored fluids are prepared. In these experiments, the colored fluids were heat-aged in order to test the shelf life of the fluids. A high SDI index after the aging process indicates that significant particle formation does not occur and indicates a long shelf life for the fluids.

After heat-aging, twenty ml of the heat-aged fluid to be tested was poured into the filter funnel and a stopwatch (with a resolution of hundredths of a second) was used to measure the time required for the fluid to pass through the filter. This time was recorded as "$T_1$." A 160 ml aliquot of the heat-aged fluid to be tested was then poured into the filter funnel and allowed to pass through the filter. Although the time required for this second aliquot to pass through the filter need not be recorded, it is designated "$T_2$." Next, a second 20 ml aliquot of the heat-aged liquid to be tested was poured into the filter funnel and the time required for the fluid to pass through the filter was measured with the stopwatch. This time was recorded as "$T_3$." SDI is then calculated by dividing $T_1$ by $T_3$.

Example 1

Preparation of Non-Aqueous Food Grade Colored Fluids

This example describes a method for producing non-aqueous food grade colored fluids from food grade FD&C dyes, 1,2-propanediol and glycerine. Three illustrative formulations and colors for these formulations are shown in Table 2.

The colored fluids were prepared as follows. The 1,2-propanediol, glycerine, methylparaben and propylparaben were mixed together in a container approved for food use at 50° C. for approximately 20 minutes. The FD&C dyes were then added while mixing, the heater was turned off, and mixing continued for about one hour. Next the isopropanol was added, the mixing continued for another ten minutes and the mixture was allowed to cool to ambient temperature. The resulting colored fluid was then filtered with a 0.2 μm filter.

TABLE 2

Non-aqueous Food Grade Colored Fluid Formulations

|  | SAMPLE A | SAMPLE B | SAMPLE C |
|---|---|---|---|
| Color | Blue (Cyan) | Magenta | Yellow |
| 1,2-propanediol | 92.33 | 89.49 | 89.93 |
| Methylparaben | 0.05 | 0.05 | 0.05 |
| Propylparaben | 0.02 | 0.02 | 0.02 |
| Glycerine | 4.00 | 6.00 | 6.00 |
| FD&C Blue 1 | 1.60 | 0.008 |  |
| FD&C Red 3 |  | 2.30 |  |
| FD&C Red 40 |  | 0.130 |  |
| FD&C Yellow 5 |  |  | 2.30 |
| Isopropanol | 2.00 | 2.00 | 2.00 |
| Surface Tension (dynes/cm) | 39.6 | 39.1 | 38.4 |
| Viscosity (centipoise) | 54.2 | 53.5 | 58.2 |
| Heat Test SDI | 0.96 | 0.99 | 0.998 |
| Apparent pH | 4.89 | 8.48 | 6.86 |
| Absorbance | 0.569 | 0.613 | 0.569 |
|  | (@ 629 nm) | (@ 526 nm) | (@ 427 nm) |
| Specific Gravity | 1.0493 | 1.0638 | 1.0638 |

Each of the FD&C dyes listed in Tables 2-4 and 6-8 are available from Sensient Colors, Inc., St. Louis, Mo.

Example 2

Preparation of Low Water Content Food Grade Colored Fluids

This example describes a method for producing low water content food grade colored fluids from food grade FD&C dyes, 1,2-propanediol and glycerine. Seven illustrative formulations and colors for these formulations are shown in Tables 3 and 4. The colored fluids were made according to the procedure described in Example 1 above, with the exception that the water and any sodium hydroxide present were added during the initial mixing step.

TABLE 3

Low Water Content Food Grade Colored Fluid Formulations

|  | SAMPLE D | SAMPLE E | SAMPLE F | SAMPLE G |
|---|---|---|---|---|
| Color | Red | Yellow | Green | Blue |
| 1,2-propanediol | 41.685 | 43.933 | 41.94 | 41.85 |
| Glycerine | 38.00 | 38.00 | 38.00 | 38.00 |
| DI Water | 16.00 | 14.00 | 16.00 | 16.00 |
| 1 N NaOH |  |  | 0.060 |  |
| FD&C Blue 1 | 0.015 | 0.025 | 0.80 | 1.60 |
| FD&C Red 3 | 1.00 |  |  | 0.55 |
| FD&C Red 40 | 1.30 | 0.042 |  |  |
| FD&C Yellow 5 |  | 2.00 | 1.20 |  |
| Isopropanol | 2.00 | 2.00 | 2.00 | 2.00 |
| Surface Tension (dynes/cm) | 44.8 | 43.8 | 44.1 | 45.1 |
| Viscosity (centipoise) | 40.0 | 46.6 | 40.3 | 41.4 |
| Heat Test SDI | 0.99 | 0.83 | 0.88 | 0.90 |

TABLE 3-continued

Low Water Content Food Grade Colored Fluid Formulations

|  | SAMPLE D | SAMPLE E | SAMPLE F | SAMPLE G |
|---|---|---|---|---|
| Apparent pH | 7.58 | 6.89 | 6.65 | 6.03 |
| Absorbance | 0.824 | 0.529 | 0.675 | 0.665 |
|  | (@ 525 nm) | (@ 426 nm) | (@ 629 nm) | (@ 629 nm) |
|  |  |  | 0.357 |  |
|  |  |  | (@ 412 nm) |  |
| Specific Gravity | 1.13 | — | 1.123 | 1.1263 |

TABLE 4

Low Water Content Food Grade Colored Fluid Formulations

|  | SAMPLE H | SAMPLE I | SAMPLE J |
|---|---|---|---|
| Color | Black | Black | Brown |
| 1,2-propanediol | 42.88 | 43.55 | 42.54 |
| Methylparaben | 0.05 | 0.05 | 0.05 |
| Propylparaben | 0.02 |  | 0.02 |
| Glycerine | 38.00 | 38.00 | 40.00 |
| DI Water | 14.00 | 14.00 | 13.00 |
| 1 N NaOH | 0.05 | 0.05 |  |
| FD&C Yellow 6 | 0.35 | 0.28 |  |
| FD&C Blue 1 | 0.96 | 0.77 | 0.18 |
| FD&C Red 40 | 1.69 | 1.35 | 1.28 |
| FD&C Yellow 5 |  |  | 0.93 |
| Isopropanol | 2.00 | 2.00 | 2.00 |
| Surface Tension (dynes/cm) | 45.0 | 44.5 | 44.0 |
| Viscosity (centipoise) | 47.1 | 47.2 | 51.9 |
| Heat Test SDI | 0.81 | 0.85 | 0.62 |
| Apparent pH | 6.74 | 6.95 | 6.19 |
| Absorbance | 0.790 | 0.610 | 0.295 |
|  | (@ 629 nm) | (@ 629 nm) | (@ 629 nm) |
|  | 0.590 | 0.436 | 0.717 |
|  | (@ 504 nm) | (@ 504 nm) | (@ 494 nm) |
|  | 0.246 | 0.191 | 0.689 |
|  | (@ 409 nm) | (@ 409 nm) | (@ 426 nm) |
| Specific Gravity | 1.1259 | 1.127 | 1.1287 |

Example 3

Preparation of Food Grade Colored Fluids from Natural Dyes

This example describes a method for producing food grade colored fluids from food grade natural dyes, 1,2-propanediol and glycerine. Four illustrative formulations and colors for these formulations are shown in Table 5. The colored fluids were made according to the procedure described in Example 1 above, with the exception that any water present was added in the initial mixing step and the natural dyes were added in the second mixing step, rather than the FD&C dyes.

TABLE 5

Food Grade Colored Fluid Formulations Made From Natural Dyes

|  | SAMPLE K | SAMPLE L | SAMPLE M | SAMPLE N |
|---|---|---|---|---|
| Color | Red | Yellow | Yellow | Blue |
| 1,2-propanediol | 59.5 | 39.7 | 42.0 | 24.0 |
| Glycerine | 6.00 | 6.0 | 6.0 | 4.0 |
| DI Water |  | 50.0 |  | 50.0 |
| Carminic Acid | 32.5 |  |  |  |

TABLE 5-continued

Food Grade Colored Fluid Formulations Made From Natural Dyes

|  | SAMPLE K | SAMPLE L | SAMPLE M | SAMPLE N |
|---|---|---|---|---|
| (7.5%) liquid[a] Gardenia Yellow[b] |  | 2.0 |  |  |
| Tumeric Liquid[c] |  |  | 50.0 |  |
| Gardenia Blue[d] |  |  |  | 20.0 |
| Isopropanol | 2.00 | 2.00 | 2.00 | 2.00 |
| Surface Tension (dynes/cm) | 41.7 | 46.3 | 37.1 | 46.4 |
| Viscosity (centipoise) | 18.4 | 5.92 | 38.0 | 13.1 |
| Apparent pH | 7.42 | 3.96 | 4.67 | 5.62 |
| Absorbance | 0.718 (@ 556 nm) 0.694 (@ 527 nm) | 0.394 (@ 438 nm) | 0.368 (@ 425 nm) | 0.929 (@ 596 nm) |
| Specific Gravity | 1.064 | 1.054 | 1.035 | 1.113 |

[a] A natural food dye obtained from Sensient Colors, Inc., containing 7.5 wt. % cochineal in propylene glycol.
[b] A natural food dye obtained from Sensient Colors, Inc.
[c] A natural food dye obtained from Sensient Colors, Inc., containing 7.7 wt. % ethyl alcohol, 90.8 wt. % propylene glycol and 1.5 wt. % oleoresin turmeric which itself contains 48–50 wt. % curcumin with a balance of flavor and gum components.
[d] A natural food dye obtained from Sensient Colors, Inc.

Example 4

Preparation of Low Inorganic Salt Content Food Grade Colored Fluids

This example describes a method for producing low inorganic salt content food grade colored fluids from low salt food grade FD&C dyes, 1,2-propanediol and glycerine. Three illustrative formulations and colors for these formulations are shown in Table 6. The colored fluids were made according to the procedure described in Example 1 above.

TABLE 6

Low Inorganic Salt Content Colored Fluid Formulations

|  | SAMPLE O | SAMPLE P | SAMPLE Q |
|---|---|---|---|
| Color | Yellow | Blue (Cyan) | Blue (Blue) |
| 1,2-propanediol | 91.80 | 92.33 | 91.78 |
| Glycerine | 4.00 | 4.00 | 4.00 |
| Methylparaben |  | 0.05 | 0.05 |
| Propylparaben |  | 0.02 | 0.02 |
| Low Salt FD&C Blue 1[e] |  | 1.60 | 1.60 |
| FD&C Red 3 |  |  | 0.55 |
| Low Salt FD&C Yellow 5[f] | 2.20 |  |  |
| Isopropanol | 2.00 | 2.00 | 2.00 |
| Surface Tension (dynes/cm) | 39.6 | 39.2 | 39.4 |
| Viscosity (centipoise) | 53.9 | 49.5 | 50.4 |
| Heat Test SDI | — | 0.51 | 0.82 |
| Apparent pH | 7.84 | 5.53 | 7.75 |
| Absorbance | 0.593 (@ 428 nm) | 0.973 (@ 629 nm) | 0.677 (@ 629 nm) 0.168 (@ 526 nm) |
| Specific Gravity | 1.0505 | 1.0493 | 1.0529 |

[e] The formulation for this low salt blue dye is presented in Table 1, above.
[f] The formulation for this low salt yellow dye is presented in Table 1, above.

Example 5

Preparation of Low Viscosity Food Grade Colored Fluids

This example describes a method for producing low viscosity food grade colored fluids from food grade FD&C dyes, 1,2-propanediol and glycerine. Three illustrative formulations and colors for these formulations are shown in Tables 7 and 8. The colored fluids were prepared as follows. The 1,2-propanediol, glycerine, water and Docusate sodium were mixed together at 40° C. for approximately 20 minutes. The FD&C dyes were then added while mixing, the heater was turned off, and mixing continued for about one hour. The mixture was allowed to cool to ambient temperature. The resulting colored fluid was then filtered with a 0.2 μm filter.

TABLE 7

Low Viscosity Food Grade Colored Fluid Formulations

|  | SAMPLE R | SAMPLE S | SAMPLE T |
|---|---|---|---|
| Color | Cyan | Cyan | Cyan |
| 1,2-propanediol | 50.0 | 49.3 | 70.0 |
| DI water | 41.9 | 33.0 | 23.9 |
| Glycerine | 5.0 | 14.0 | 3.0 |
| 1% Docusate sodium | 1.5 | 0 | 1.5 |
| 1.0 N NaOH | 0 | 0.10 | 0 |
| FD&C Blue 1 | 1.6 | 1.6 | 1.6 |
| Isopropanol | 0 | 2.0 | 0 |
| Surface Tension (dynes/cm) | 48.0 | 44.0 | 44.4 |
| Viscosity (centipoise) | 7.62 | 11.4 | 14.8 |
| SDI |  | 0.92 |  |
| Apparent pH | 5.51 | 5.76 | 5.24 |
| Absorbance | — | 0.665 (@ 629 nm) |  |
| Specific Gravity | — | 1.071 |  |

TABLE 8

Low Viscosity Food Grade Colored Fluid Formulations

|  | SAMPLE U | SAMPLE V | SAMPLE W |
|---|---|---|---|
| Color | Magenta | Yellow | Black |
| 1,2-propanediol | 49.609 | 49.23 | 47.83 |
| Methylparaben | 0.05 | 0.05 | 0.05 |
| Propylparaben | 0.02 | 0.02 | 0.02 |
| Glycerine | 14.0 | 14.0 | 14.0 |
| DI Water | 32.0 | 32.5 | 33.0 |
| FD&C Blue | 0.008 |  | 0.96 |
| FD&C Red 3 | 2.30 |  |  |
| FD&C Red 40 | 0.013 |  | 1.69 |
| FD&C Yellow 5 |  | 2.20 |  |
| FD&C Yellow 6 |  |  | 0.35 |
| Isopropanol | 2.0 | 2.0 | 2.0 |
| Surface Tension (dynes/cm) | 44.5 | 44.2 | 44.6 |
| Viscosity (centipoise) | 11.5 | 12.0 | 11.8 |
| pH | 8.43 | 6.44 | 7.48 |
| Absorbance | 0.633 (@ 526 nm) | 0.547 (@ 425 nm) | 0.408 (@ 629 nm) |
| Specific Gravity | 1.083 | 1.076 | 1.0818 |
| Heat Test SDI |  |  |  |

Example 6

Application of Food Grade Colored Fluids to an Edible Substrate

This Colored fluids can be printed through commercially available printing equipment employing printheads manufactured by manufacturers of piezo printheads such as Spectra, Xaar, Hitachi and PicoJet. When jetting Sample P, for example, the printhead is set to 60° C. One example of a printhead which could be used for jetting these fluids is the NovaQ jetting assembly 256/80 AQ, manufactured by Spectra. Inks successfully jet at frequencies including, but not limited to, 1 kHz to 20 kHz. Based on the printhead design and ink ingredients (formulations) inks may be jettable up to a frequency of 40 kHz. For highest resolution a substrate gap of 1 mm may be desirable. Substrates such as cookies, crackers, breads, marshmallows, and other edible items in a wide variety of shapes and thickness may be jetted.

Example 7

Preparation of Low Surface Tension Food Grade Colored Fluids Containing a Sorbitan Ester Surface Tension Modifier This example describes a method for producing food grade colored fluids from a low chloride food grade FD&C dye, 1,2-propanediol, glycerine and Tween® 80, a polyoxyethylene sorbitan monooleate surface tension modifier; Tween® 65, a polyoxyethylene sorbitan tristearate; and Tween® 60, a polyoxyethylene sorbitan monostearate. The formulations for the food grade colored fluids are provided in Table 9. The 1,2-propanediol, glycerine, Tween®, and deionized water were mixed together in a container approved for food use at 40° C. for approximately 10 minutes. The FD&C dye was then added while mixing at 40° C. for approximately 30 minutes. The resulting mixture was then filtered with a 0.2 μm filter. Next the isopropanol was added, the mixing continued for another ten minutes.

TABLE 9

Low Surface Tension Food Grade Colored Fluid Formulations

| | SAMPLE X (CONTROL) | SAMPLE Y | SAMPLE Z | SAMPLE AA |
|---|---|---|---|---|
| Color | Blue (Cyan) | Blue (Cyan) | Blue (Cyan) | Blue (Cyan) |
| 1,2-propanediol | 66.4 | 66.3 | 66.3 | 66.3 |
| Glycerine | 5 | 5 | 5 | 5 |
| Tween ® 80 | | 0.1 | | |
| Tween ® 65 | | | 0.1 | |
| Tween ® 60 | | | | 0.1 |
| Deionized Water | 25 | 25 | 25 | 25 |
| FD&C Blue 1 (low Cl⁻, Table 1) | 1.60 | 1.60 | 1.60 | 1.60 |
| Isopropanol | 2.00 | 2.00 | 2.00 | 2.00 |
| Surface Tension (dynes/cm at 25° C.) | 43.2 | 31 | 42.5 | 37 |

Example 8

Preparation of Low Surface Tension Food Grade Colored Fluids Containing a Fatty Acid Surface Tension Modifier This example describes a method for producing food grade colored fluids from a low chloride food grade FD&C dye, 1,2-propanediol, glycerine and Sylfat® FA-1, a surface tension modifier composed of a mixture of oleic and linoleic fatty acids. The formulations for the food grade colored fluids are provided in Table 10. The 1,2-propanediol, glycerine, deionized water and NaOH were mixed together in a container approved for food use at 40° C. for approximately 10 minutes. The FD&C dye was then added while mixing at 40° C. for approximately one hour. The resulting mixture was then filtered with a 0.2 μm filter. Finally, the Sylfat® FA-1 was added to the mixture.

TABLE 10

Low Surface Tension Food Grade Colored Fluid Formulations

| | SAMPLE BB | SAMPLE CC |
|---|---|---|
| Color | Blue (Cyan) | Blue (Cyan) |
| 1,2-propanediol | 90.06 | 87.75 |
| Glycerine | 3.9 | 3.8 |
| NaOH | 0.03 | 0.03 |
| Deionized Water | 1.95 | 1.90 |
| FD&C Blue 1 (low Cl⁻, Table 1) | 1.56 | 1.52 |
| Sylfat ® FA-1 | 2.5 | 5.0 |
| Surface Tension (dynes/cm at 25° C.) | 36.4 | 36.4 |

Example 9

Preparation of Low Surface Tension Food Grade Colored Fluids Containing a Polyglycerol Ester Surface Tension Modifier This example describes a method for producing food grade colored fluids from a low chloride food grade FD&C dye, 1,2-propanediol, glycerine and Santone® 8-1-0, a octaglycerol monooleate surface tension modifier. The formulations for the food grade colored fluids are provided in Table 11. The 1,2-propanediol, glycerine, deionized water and NaOH were mixed together in a container approved for food use at 40° C. for approximately 10 minutes. The FD&C dye was then added while mixing at 40° C. for approximately one hour. The resulting mixture was then filtered with a 0.2 μm filter. Finally, the Santone® 8-1-0 was added to the mixture.

TABLE 11

Low Surface Tension Food Grade Colored Fluid Formulations

| | SAMPLE DD | SAMPLE EE |
|---|---|---|
| Color | Blue (Cyan) | Blue (Cyan) |
| 1,2-propanediol | 91.9 | 92.27 |
| Glycerine | 3.98 | 4 |
| NaOH | 0.03 | 0.03 |
| Deionized Water | 2 | 2 |
| FD&C Blue 1 (low Cl⁻, Table 1) | 1.59 | 1.6 |
| Santone ® 8-1-0 | 0.5 | 0.1 |
| Surface Tension (dynes/cm at 25° C.) | 35.8 | 36.4 |

Example 10

Preparation of Low Surface Tension, Low Water Content Food Grade Colored Fluids Containing a Sorbitan Ester Surface Tension Modifier This example describes a method for producing food grade colored fluids from a low chloride food grade FD&C dye, 1,2-propanediol, glycerine and Tween® 80, a polyoxyethylene sorbitan monooleate surface tension modifier. The formulations for the food grade colored fluids are provided in Table 12. The 1,2-propanediol, glycerine, deionized water and NaOH were mixed together in a container approved for food use at 40° C. for approximately 10 minutes. The FD&C dye was then added while mixing at 40° C. for approximately one hour. The resulting mixture was then filtered with a 0.2 μm filter. Finally, the Tween® 80 was added to the mixture.

TABLE 12

Low Surface Tension Food Grade Colored Fluid Formulations

|  | SAMPLE FF | SAMPLE GG | SAMPLE HH | SAMPLE II |
|---|---|---|---|---|
| Color | Blue (Cyan) | Blue (Cyan) | Blue (Cyan) | Blue (Cyan) |
| 1,2-propanediol | 92.27 | 91.9 | 91.45 | 87.75 |
| Glycerine | 4 | 3.98 | 3.96 | 3.8 |
| NaOH | 0.03 | 0.03 | 0.03 | 0.03 |
| Deionized Water | 2 | 2 | 1.98 | 1.90 |
| FD&C Blue 1 (low Cl⁻, Table 1) | 1.6 | 1.59 | 1.58 | 1.52 |
| Tween® 80 | 0.1 | 0.5 | 1.0 | 5.0 |
| Surface Tension (dynes/cm at 25° C.) | 41 | 39.6 | 39.2 | 38.5 |

Example 11

Preparation of Low Surface Tension, Low Water Content Food Grade Colored Fluids Containing a Sorbitan Ester Surface Tension Modifier This example describes a method for producing food grade colored fluids from a low chloride food grade FD&C dye, 1,2-propanediol, glycerine and Tween® 60, a polyoxyethylene sorbitan monostearate surface tension modifier and Tween® 65, a polyoxytheylene sorbitan tristearate surface tension modifier. The formulations for the food grade colored fluids are provided in Table 13. The 1,2-propanediol, glycerine, deionized water and NaOH were mixed together in a container approved for food use at 40° C. for approximately 10 minutes. The FD&C dye was then added while mixing at 40° C. for approximately one hour. The resulting mixture was then filtered with a 0.2 μm filter. Next the isopropanol was added and the mixing continued. Finally, the Tween® was added to the mixture.

TABLE 13

Low Surface Tension Food Grade Colored Fluid Formulations

|  | SAMPLE JJ | SAMPLE KK |
|---|---|---|
| Color | Blue (Cyan) | Blue (Cyan) |
| 1,2-propanediol | 89.47 | 89.47 |
| Glycerine | 3.96 | 3.96 |
| NaOH | 0.03 | 0.03 |
| Deionized Water | 1.98 | 1.98 |
| FD&C Blue 1 (low Cl⁻, Table 1) | 1.58 | 1.58 |
| Isopropanol | 1.98 | 1.98 |
| Tween® 60 | 1.0 |  |
| Tween® 65 |  | 1.0 |
| Surface Tension (dynes/cm at 25° C.) | 37.5 | 39.1 |

Example 12

Preparation of Low Surface Tension, Low Water Content Food Grade Colored Fluids Containing a Lecithin Surface Tension Modifier This example describes a method for producing food grade colored fluids from a low chloride food grade FD&C dye, 1,2-propanediol, glycerine and Yelkin® 1018, a hydroxylated lecithin surface tension modifier. The formulations for the food grade colored fluids are provided in Table 14. The 1,2-propanediol, glycerine, deionized water and NaOH were mixed together in a container approved for food use at 40° C. for approximately 10 minutes. The FD&C dye was then added while mixing at 40° C. for approximately one hour. The resulting mixture was then filtered with a 0.2 μm filter. Next the isopropanol was added and the mixing continued. Finally, the Yelkin® 1018 was added to the mixture.

TABLE 14

Low Surface Tension Food Grade Colored Fluid Formulations

|  | SAMPLE LL | SAMPLE MM |
|---|---|---|
| Color | Blue (Cyan) | Blue (Cyan) |
| 1,2-propanediol | 90.27 | 89.90 |
| Glycerine | 4 | 3.98 |
| NaOH | 0.03 | 0.03 |
| Deionized Water | 2 | 2 |
| FD&C Blue 1 (low Cl⁻, Table 1) | 1.6 | 1.59 |
| Isopropanol | 2 | 2 |
| Yelkin® 1018 | 0.1 | 0.5 |
| Surface Tension (dynes/cm at 25° C.) | 39.5 | 33.2 |

The invention has been described with reference to very specific and illustrative embodiments. However, it should be understood that many variations and modifications may be made while remaining within the spirit and scope of the invention.

What is claimed is:

1. A food grade colored fluid comprising a food grade dye; glycerine; at least about 25 wt. % 1,2-propanediol; and a surface tension modifier selected from the group consisting of sorbitan esters, fatty acids, polyol esters of fatty acids, lecithins and mixtures thereof; wherein the 1,2-propanediol, glycerine and any optional water make up at least about 90 wt. % of the colored fluid, and any water present makes up no more than about 35 wt. % of the colored fluid.

2. The food grade colored fluid of claim 1 wherein the food grade colored fluid has a surface tension of no more than about 38 dynes per cm at 25° C.

3. The food grade colored fluid of claim 1 wherein the food grade colored fluid has a surface tension of about 25 to 35 dynes per cm at 25° C.

4. The food grade colored fluid of claim 3 wherein the food grade colored fluid has a surface tension of no more than about 32 dynes per cm at 25° C.

5. The food grade colored fluid of claim 1 wherein the surface tension modifier comprises a polyoxyethylene sorbitan ester.

6. The food grade colored fluid of claim 5 wherein the polyoxyethylene sorbitan ester comprises polyoxyethylene sorbitan monooleate, polyoxyethylene sorbitan monopalmitate, polyoxyethylene sorbitan monolaurate, or a mixture thereof.

7. The food grade colored fluid of claim 1 wherein the surface tension modifier comprises a fatty acid polyglycerol ester.

8. The food grade colored fluid of claim 1 wherein the fatty acid polyglycerol ester comprises a polyglycerol fatty acid monoester.

9. The food grade colored fluid of claim 8 wherein the polyglycerol fatty acid monoester comprises octaglycerol monooleate.

10. The food grade colored fluid of claim 1 wherein the surface tension modifier comprises oleic acid, linoleic acid or a mixture thereof.

11. The food grade colored fluid of claim 1 comprising at least about 2 wt. % glycerine.

12. The food grade colored fluid of claim 1 comprising at least about 70 wt. % 1,2-propanediol.

13. The food grade colored fluid of claim 1 comprising about 0.1 to 10 wt. % of the food grade dye.

14. The food grade colored fluid of claim 1, wherein the colored fluid includes no more than about 10 wt. % water.

15. The food grade colored fluid of claim 1, wherein the colored fluid has a viscosity of about 5 to 15 cps at 60° C.

16. The food grade colored fluid of claim 1, wherein the colored fluid has a silt density index of at least 0.75.

17. The food grade colored fluid of claim 1, wherein the food grade dye has an inorganic salt content of no more than about 0.1 wt. %.

18. The food grade colored fluid of claim 1, wherein the food grade dye has a chloride ion content of no more than about 500 ppm.

19. The food grade colored fluid of claim 1, wherein the food grade dye has a sulfate ion content of no more than about 500 ppm.

20. A food grade colored fluid comprising food grade dye, about 25 to 95 wt. % 1,2-propanediol, about 1 to 50 wt. % glycerine, about 0.01 to 5 wt. % surface tension modifier selected from the group consisting of sorbitan esters, fatty acids, mixtures of fatty acids, and esters of fatty acids, and no more than about 10 wt. % water; wherein the colored fluid has a surface tension of no more than about 38 dynes per cm at 25° C.

21. A food grade colored fluid comprising food grade dye; food grade glycol; glycerine; and a surface tension modifier selected from the group consisting of sorbitan esters, fatty acids, polyol esters of fatty acids, and mixtures thereof; wherein the food grade glycol, glycerine and any optional water make up at least about 90 wt. % of the colored fluid; and any water present makes up no more than about 10 wt. % of the colored fluid; and further wherein the colored fluid has a surface tension of no more than about 38 dynes per cm at 25° C.

22. A food grade colored fluid comprising food grade dye; at least about 50 wt. % 1,2-propanediol; and a surface tension modifier selected from the group consisting of sorbitan esters, fatty acids, mixtures of fatty acids, and esters of fatty acids; wherein the food grade dye has an inorganic salt content of no more than about 0.1 wt. %.

23. The food grade colored fluid of claim 22 comprising at least about 70 wt. % 1,2-propanediol, glycerine or a mixture thereof.

24. The food grade colored fluid of claim 22, wherein the colored fluid has a surface tension of no more than about 40 dynes per cm at 25° C.

25. A food grade colored fluid comprising food grade dye; no more than about 10 wt. % water; a surface tension modifier selected from the group consisting of sorbitan esters, fatty acids, mixtures of fatty acids, esters of fatty acids, and lecithins; and at least about 70 wt. % 1,2-propanediol, glycerine or a mixture thereof.

26. The food grade colored fluid of claim 25 wherein the colored fluid has a surface tension of no more than about 38 dynes per cm at 25° C.

27. The food grade colored fluid of claim 25 comprising at least about 85 wt. % 1,2-propanediol.

28. The food grade colored fluid of claim 25 comprising about 2 to 10 wt. % glycerine.

29. The food grade colored fluid of claim 25 comprising no more than about 5 wt. % water.

30. The food grade colored fluid of claim 25, wherein the food grade dye has an inorganic salt content of no more than about 0.1 wt. %.

31. The food grade colored fluid of claim 25, wherein the food grade dye has a chloride ion content of no more than about 500 ppm.

32. The food grade colored fluid of claim 25, wherein the food grade dye has a sulfate ion content of no more than about 500 ppm.

33. The food grade colored fluid of claim 25, wherein the colored fluid has a viscosity of about 5 to 15 cps at 60° C.

34. An edible substrate having the food grade colored fluid of claim 1 applied to at least one surface thereof.

35. The edible substrate of claim 34 wherein the edible substrate is selected from the group consisting of crackers, chewing gum, biscuits, cereal, taco shells, granola bars, rice cakes, cookies, pie crusts, waffles, cakes, marshmallows, candies, pasta and bread products.

36. A food grade colored fluid comprising food grade dye; a surface tension modifier selected from the group consisting of sorbitan esters, fatty acids, polyol monoesters and esters of fatty acids, mixtures of fatty acids, lecithins and mixtures thereof; and at least about 70 wt. % 1,2-propanediol, glycerine or a mixture thereof, provided that the colored fluid comprises at least about 10 wt. % 1,2-propanediol.

37. The food grade colored fluid of claim 36 wherein surface tension modifier comprises lecithin having an HLB of at least about 9.

38. The food grade colored fluid of claim 36 wherein lecithin comprises hydroxylated lecithin.

39. The food grade colored fluid of claim 36 wherein lecithin comprises about 0.1 to about 3 wt. % hydroxylated soy lecithin.

40. The food grade colored fluid of claim 36 wherein the colored fluid has a surface tension of no more than about 35 dynes per cm at 25° C.

41. The food grade colored fluid of claim 36 wherein the surface tension modifier comprises a polyglycerol fatty acid monoester.

42. The food grade colored fluid of claim 41 wherein the polyglycerol fatty acid monoester comprises octaglycerol monooleate.

43. The food grade colored fluid of claim 41 comprising at least about 70 wt. % 1,2-propanediol.

44. The food grade colored fluid of claim 41 wherein the food grade colored fluid has a surface tension of no more than about 38 dynes per cm at 25° C.

45. The food grade colored fluid of claim 41 wherein the colored fluid has a silt density index of at least 0.75 and a viscosity of about 5 to 15 cps at 60°.

46. The food grade colored fluid of claim 41 wherein the colored fluid has a viscosity of about 35 to 65 cps at 25° C.

47. The food grade colored fluid of claim 36 comprising about 0.05 to 2.0 wt. % of the surface tension modifier; and at least about 70 wt. % 1,2-propanediol.

48. The food grade colored fluid of claim 47 wherein the surface tension modifier comprises a polyglycerol fatty acid monoester.

49. The food grade colored fluid of claim 48 wherein the polyglycerol fatty acid monoester comprises octaglycerol monooleate.

50. The food grade colored fluid of claim 48 wherein the food grade colored fluid has a surface tension of no more than about 38 dynes per cm at 25° C.; a silt density index of at least 0.75; a pH of about 5 to 8; and a viscosity of about 35 to 65 cps at 25° C.

* * * * *